Nov. 14, 1950     J. S. CONNORS     2,529,868
HITCH COUPLING
Original Filed June 11, 1946     3 Sheets—Sheet 1
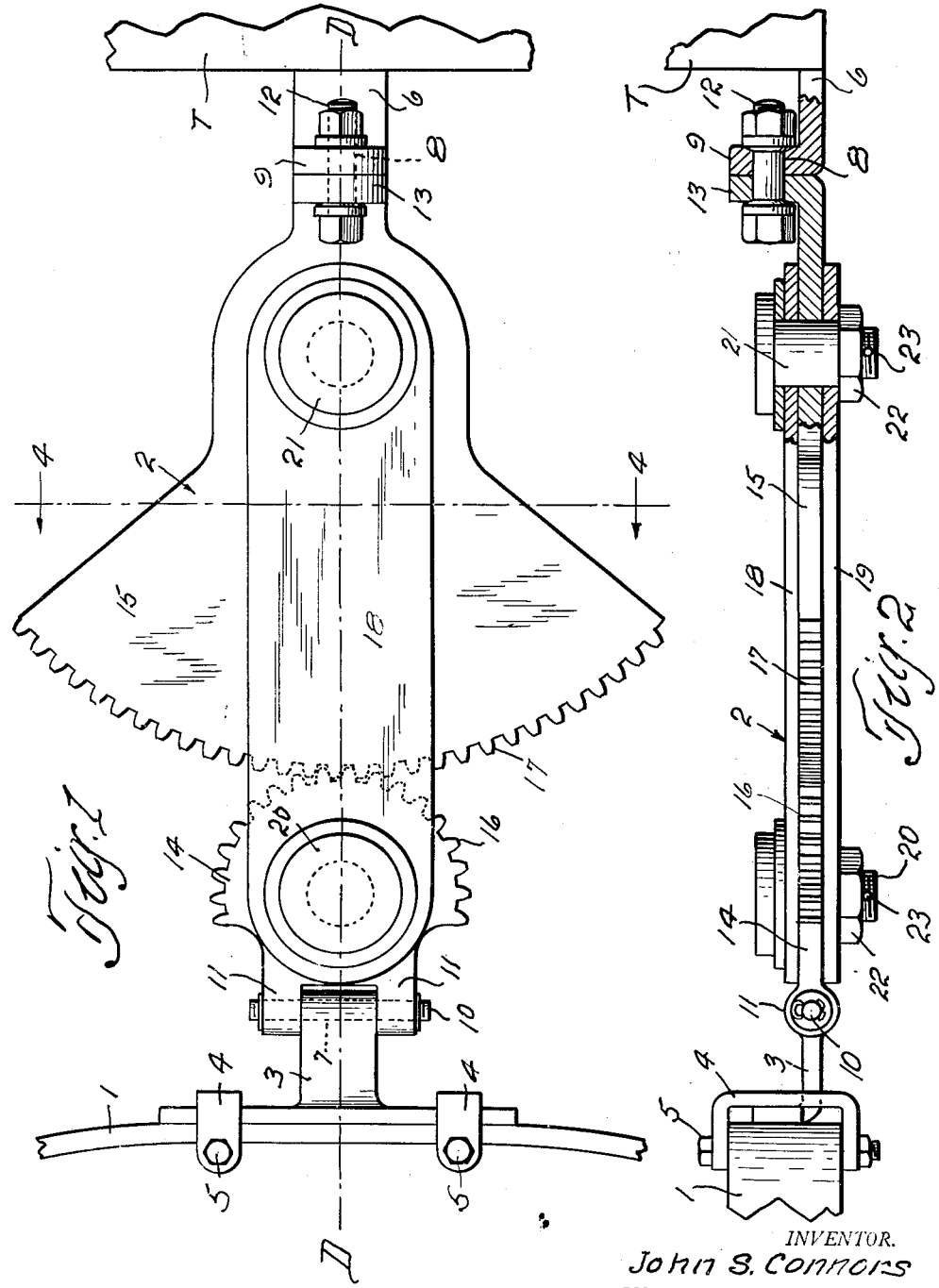
INVENTOR.
John S. Connors
BY
Chas. H. Trotter
Atty.

Nov. 14, 1950     J. S. CONNORS     2,529,868
HITCH COUPLING
Original Filed June 11, 1946     3 Sheets-Sheet 2
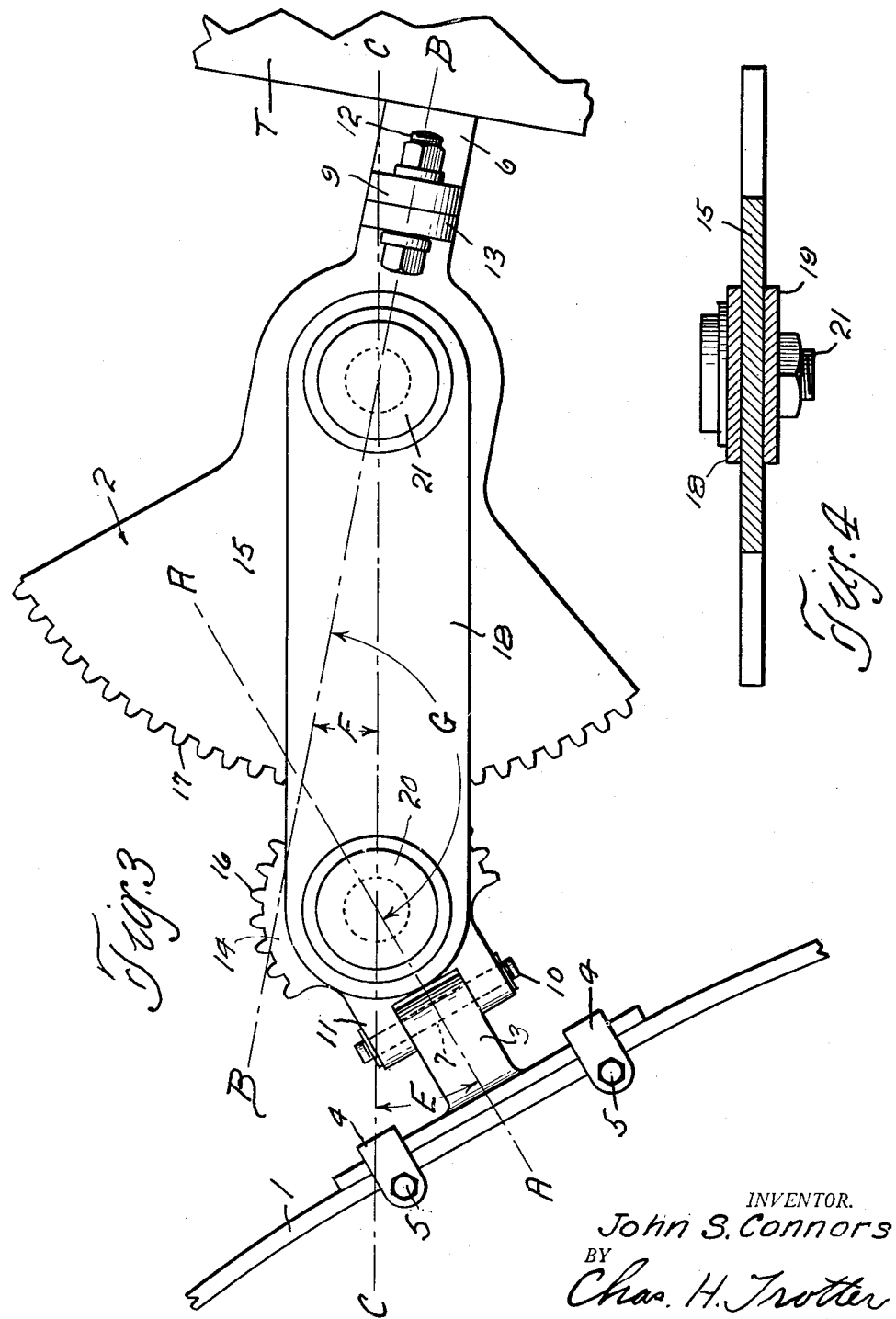
INVENTOR.
John S. Connors
BY Chas. H. Trotter
Atty.

Nov. 14, 1950 — J. S. CONNORS — 2,529,868
HITCH COUPLING
Original Filed June 11, 1946 — 3 Sheets-Sheet 3
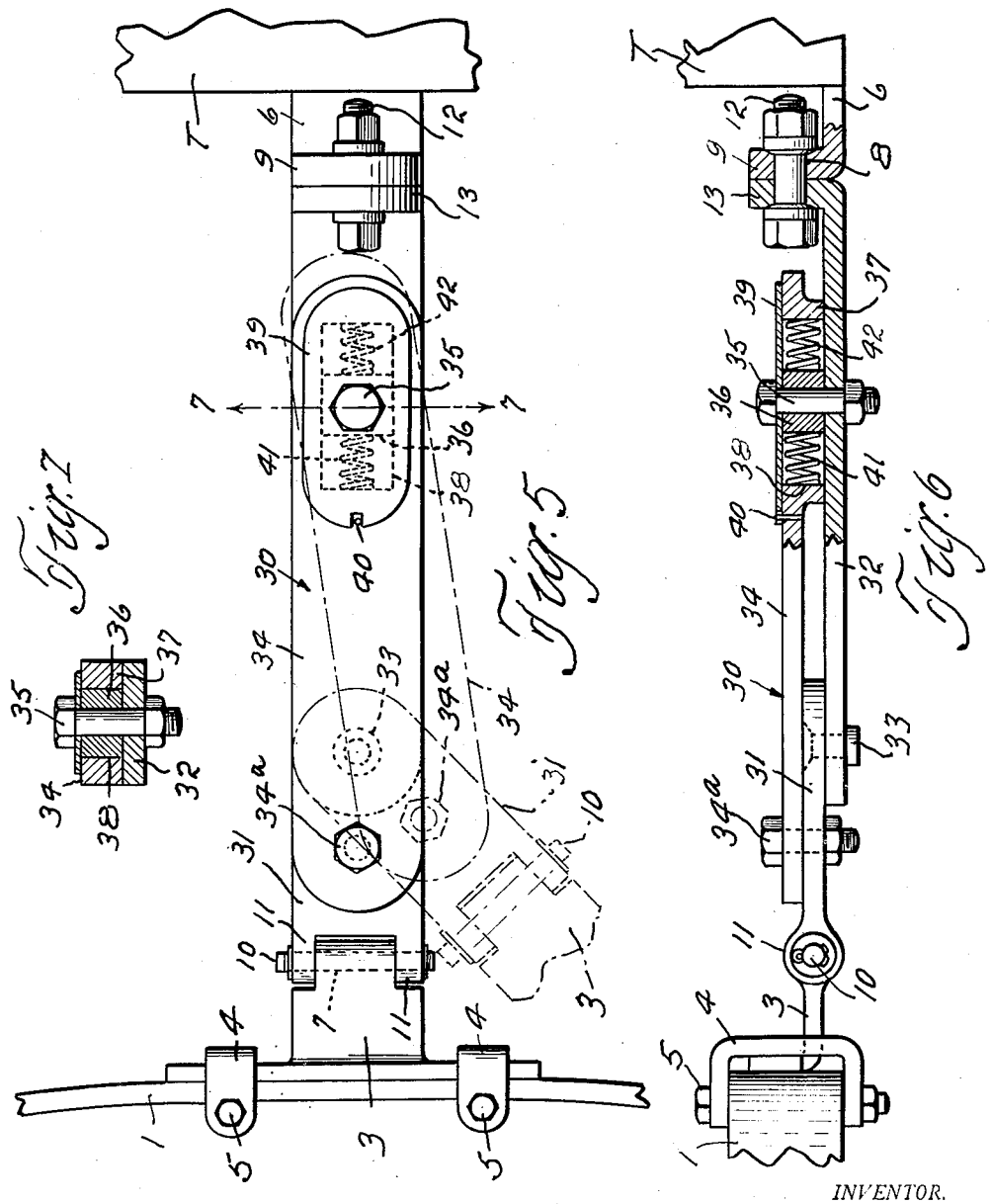
INVENTOR.
John S. Connors
BY Chas. H. Trotter
Atty.

Patented Nov. 14, 1950

2,529,868

UNITED STATES PATENT OFFICE 2,529,868

HITCH COUPLING

John S. Connors, Cleveland, Ohio

Substituted for abandoned application Serial No. 673,860, June 11, 1946. This application December 4, 1947, Serial No. 789,729

10 Claims. (Cl. 280—33.44)

1

This invention relates to a trailer hitch for coupling a trailer to a leading power-operated vehicle. It is particularly adapted for detachably coupling a trailer of any type to an automobile or truck. It is also equally well adapted for connecting a power drawn farming implement to the rear end of a tractor.

This application is being filed as a substitute for my copending application Serial No. 673,860, filed June 11, 1946, now abandoned.

One of the particular objects of the invention is to construct a device of this character which in combination with other features provides a universal coupling between a power-operated leading vehicle and a trailer so that the trailer may more readily follow the leading vehicle over uneven terrain.

Another object of the invention is to provide a trailer hitch which is so constructed as to prevent buckling, jack-knifing, and pulling or swinging sidewise of the trailing vehicle.

Another object of the invention is to provide a trailer hitch which is so constructed as to cause the trailing vehicle to more accurately follow the path of the leading vehicle when making turns, especially sharp turns or small radii turns.

Another object of the invention is to provide a trailer hitch which is so constructed as to enable the driver of the power-operated vehicle to more accurately and easily control and guide the trailer, especially when backing up.

Another object of the invention is to provide a trailer hitch of this character which is so constructed and arranged that a trailing vehicle may be quickly and easily connected to and disconnected from a towing vehicle.

Still another object of the invention is to provide a trailer hitch having all the above advantages and yet is of simple construction, is durable and comparatively inexpensive to manufacture and can be easily and quickly attached and detached.

Other and more specific objects of the invention will be apparent from the following specification and the accompanying drawing forming a part thereof wherein:

Fig. 1 is a plan view of a hitch coupling constructed according to my invention showing the various parts thereof in the position they assume when the leading and trailing vehicle are traveling in a straight path;

Fig. 2 is a side elevation of the hitch coupling elevation as shown in Fig. 1, with certain of the parts in section to more clearly illustrate the construction thereof;

Fig. 3 is a view similar to Fig. 1 showing the various parts in the position they assume when the leading and trailing vehicles are traveling in a curved path;

Fig. 4 is a transverse section taken on the line 4—4 of Fig. 1;

Fig. 5 is a view similar to Fig. 1 showing a modified form of my invention;

Fig. 6 is a side elevation of the hitch coupling shown in Fig. 5, with certain parts in section to more clearly illustrate the construction thereof; and Fig. 7 is a transverse section taken on the line 7—7 of Fig. 5.

Referring now to the drawings by reference characters, the numeral 1 indicates the rear bumper of an automobile to which is attached a trailer T by means of my improved hitch coupling generally indicated by the numeral 2. A drawbar 3 is rigidly secured to the bumper 1 by clips 4 and bolts 5 and projects rearwardly therefrom; and a towbar 6 is rigidly secured to the trailer T in any suitable manner and projects forwardly therefrom. If a tractor instead of an automobile is used as the leading or towing vehicle, the drawbar 3 is rigidly and permanently secured thereto as is standard practice with tractors. The drawbar 3 has a normally horizontal transverse aperture 7 therethrough; and the towbar 6 has a normally horizontal longitudinal aperture 8 extending through the upturned forward end 9 thereof. The forward end of the hitch coupling 2 is pivotally connected to the drawbar 3 by a bolt 10 which extends through apertured ears 11 of the hitch coupling 2 and the aperture 7 in the drawbar 3; and the rear end of the hitch coupling is pivotally connected to the towbar 6 by a bolt 12 which extends through the aperture 8 and an upturned apertured lug 13 on the rear end of the hitch coupling 2. This manner of connecting the hitch coupling 2 between the leading and trailing vehicles provides a full-floating or universal connection therebetween, since the axis of the connecting bolt 10 is in a plane perpendicular to a plane through the axis of the connecting bolt 12. From the foregoing, it will be apparent that the trailer T can readily follow the towing vehicle over uneven or bumpy terrain without subjecting the hitch coupling to strains other than the normal towing strains.

The hitch coupling 2 per se comprises a pair of gear segments 14 and 15 having the teeth 16 and 17 respectively, which are in constant mesh with each other. The pitch diameter of the segment 15 as shown is approximately three and one-half times the pitch diameter of the segment 14. Any other desired ratio between the pitch diameters of the segments may be used, but the ratio of three and one-half to one has been found to be very satisfactory in practice. As is clearly shown, the ears 11 are integral with the segment 14 and the lug 13 is integral with the segment 15.

The segments 14 and 15 are held in proper mesh with each other by a pair of links 18 and 19 and by bolts 20 and 21. The link 18 is disposed above the segments 14 and 15 and the link 19 is disposed beneath the segments as clearly shown in Figs. 2 and 4. The segment 14 and links 18 and 19 are pivotally connected together at the forward end of the links by the bolts 20, and the segment 15 and the links 18 and 19 are pivotally connected together at the rear end of the links by the bolt 21. Suitable nuts 22 and cotter pins 23 hold the bolts 20 and 21 in place.

In operation all pulling or towing force between the drawbar 3 and towbar 6 is exerted indirectly through the segments 14 and 15 through the medium of the links 18 and 19 and the bolts 20 and 21, and not through any direct connection between the segments. The primary purpose of the intermeshing gear segments is to cause the trailer to more accurately follow the path of the leading vehicle, especially on a curved path; and to enable the driver to more accurately and easily guide and control the trailer when backing up. The gear segments 14 and 15 also function to prevent swaying, buckling and jack-knifing of the trailer, due to the fact that they always provide a substantially rigid connection between the leading and trailing vehicles regardless of the angular relationship between the two vehicles. The construction of the hitch coupling is such that the trailing vehicle cannot move angularly with respect to the leading vehicle, whereas the leading vehicle can move angularly with respect to the trailing vehicle.

The action of hitch coupling will be more readily understood by reference to Figs. 1 and 3 and the center lines thereon. In Fig. 1 the various parts are shown in the position they assume when the vehicles are traveling in a straight line or path, and in Fig. 3 the various parts are shown in the position they assume when the vehicles are traveling in a curved path. They may be traveling forwardly or backing up. In Fig. 3 the line A—A indicates a vertical plane through the front to aft axis of the leading vehicle; B—B indicates a vertical plane through the front to aft axis of the trailing vehicle; and the line C—C indicates a vertical plane through the axes of the bolts 20 and 21. These three planes are all disposed at an angle to each other when the vehicles are traveling in a curved path, but when the vehicles are traveling in a straight line the planes indicated by the lines A—A and B—B both merge into the plane indicated by the line C—C, as shown by the line D—D on Fig. 1. The angles between the three planes indicated on Fig. 3 are determined by the ratio between the pitch diameters of the gear segments 14 and 15 and the amount the leading vehicle pivots about the axis of the bolt 20. In Fig. 3 the leading vehicle is shown as turned about the axis of the bolt 20 until the angle E between the planes A—A and C—C is approximately 30°. This turning of the axis of the leading vehicle to one side of the plane C—C causes the axis of the trailing vehicle to pivot in the opposite direction about the axis of the bolt 21 until it forms an angle F of approximately 8°–10' with the plane C—C, and on the opposite side thereof, with respect to the angle E. The angle G thus formed between the planes A—A and B—B is then approximately 141°–50'. From this it will be apparent that as the axis of the leading vehicle is moved out of a straight line between the two vehicles in one direction the axis of the trailing vehicle is moved out of this straight line in a lesser degree in the opposite direction, the difference between the two movements being dependent upon the ratio between the pitch diameters of the gear segments 14 and 15. This opposite turning of the two axes causes the trailing vehicle to more accurately follow the path of the leading vehicle; and coupled with the inability of the trailing vehicle to turn about the axis of the bolt 21 independently of the turning of the leading vehicle about the bolt 20, it enables the driver to more accurately and easily guide the trailing vehicle when backing up.

In Figs. 5 to 7 I have shown a modified form of hitch coupling for accomplishing the objects of my invention. In this form of the invention the trailer T is connected to the leading vehicle in exactly the same manner as shown and described in connection with the preferred form of my invention, so that a full-floating or universal connection between the two vehicles is also provided with this form of my invention. The drawbar 3 and towbar 6 are constructed and connected to the vehicle and to the hitch coupling, generally indicated by the numeral 30, in the same manner as shown in Figs. 1 to 4, and same reference characters are applied to like parts in both forms.

In this form of the invention I have eliminated the gear segments and constructed the hitch coupling of a plurality of links suitably connected together, which will now be described. A link 31 having the ears 11 formed on the forward end thereof is pivotally connected adjacent its rear end to the forward end of a link 32 as indicated at 33. The rear end of the link 32 is formed integrally with the upstanding lug 13 through which the hitch coupling 30 is connected to the towbar 6 by the bolt 12. A third link 34 is pivotally connected at 34ᵃ adjacent its forward end to the link 31 forwardly of the pivotal connection 33 between the links 31 and 32. The rear end of the link 34 is pivotally and slidably connected to the link 32 towards the rear end thereof by a bolt 35 and block 36. The rear end of the link 34 is thickened as indicated at 37, and this thickened end has a longitudinal slot 38 extending therethrough. The slot 38 is closed by a cover plate 39, through which the bolt 35 extends, and is prevented from turning by a pin and slot connection indicated at 40. The block 36 through which the bolt 35 also extends is disposed within the slot 38 and extends between the upper face of the link 32 and the lower face of the cover plate 39. A pair of compression springs 41 and 42 are disposed within the slot 38, one on each side of the block 36. The link 34 in combination with the springs 41 and 42 and the slidable and pivotal connection between the link 34 and the link 32 serves the same purpose as the gear segments 14 and 15 in the preferred embodiment of my invention, and cause the hitch coupling 30 to function in the same manner as the hitch coupling 2.

From the foregoing it will be apparent to those skilled in this art that I have provided a simple and efficient mechanism for carrying out the objects of my invention. It is to be understood that I am not restricted to the specific forms of the invention disclosed herein as various modifications may be made thereto within the scope of the appended claims.

Having thus described my invention, I claim:

1. A hitch coupling for securing a trailing vehicle to a towing vehicle comprising a plurality of members pivotally secured together, a pivotal connection between one of said members and the towing vehicle, a pivotal connection between another of said members and the trailing vehicle, the axes of said first-mentioned pivotal connection and said second-mentioned pivotal connection being in planes perpendicular to each other, and means associated with said plurality of members and operative to prevent turning of the trailing vehicle independently of the towing vehicle.

2. A hitch coupling for securing a trailing vehicle to a towing vehicle comprising a plurality of members pivotally secured together, a pivotal connection between one of said members and the towing vehicle, a pivotal connection between another of said members and the trailing vehicle, the axes of said first-mentioned pivotal connection and said second-mentioned pivotal connection being in planes perpendicular to each other, and means associated with said plurality of members and operative when the towing vehicle turns in one direction to cause the trailing vehicle to turn in the opposite direction.

3. A hitch coupling for securing a trailing vehicle to a towing vehicle comprising a pair of gear segments meshing with each other, a pivotal connection between one of said gear segments and the towing vehicle, a pivotal connection between the other of said gear segments and the trailing vehicle, the axes of said pivotal connections being disposed in planes perpendicular to each other, and a link having one end thereof pivotally secured to one of said gear segments and the other end thereof pivotally secured to the other of said gear segments.

4. A hitch coupling for securing a trailing vehicle to a towing vehicle comprising, a pair of links pivotally secured to each other, means detachably securing one of said links to the towing vehicle, means detachably securing the other of said links to the trailing vehicle, and a third link pivotally secured adjacent one end thereof to one of said pair of links and pivotally and slidably secured adjacent the other end thereof to the other of said pair of links.

5. A hitch coupling for securing a trailing vehicle to a towing vehicle comprising, a link detachably secured to the towing vehicle, a second link detachably secured at one end thereof to the trailing vehicle and pivotally connected adjacent its other end to said link, a third link having one end thereof pivotally connected to said link forwardly of the pivotal connection between said link and said second link and having the other end thereof slidably connected to said second link, and spring means interposed between said second link and said third link.

6. A hitch coupling for securing a trailing vehicle to a towing vehicle comprising, a link detachably secured to the towing vehicle, a second link detachably secured at one end thereof to the trailing vehicle and pivotally connected adjacent its other end to said link, a third link having one end thereof pivotally connected to said link forwardly of the pivotal connection between said link and said second link, an elongated slot extending through said third link longitudinally thereof, a block pivotally secured to said second link and extending into said slot and spring means disposed in said slot between the ends of said slot and said block.

7. A hitch coupling for securing a trailing vehicle to a towing vehicle comprising, a pair of links pivotally secured to each other adjacent one end thereof, means pivotally connecting the other end of one of said links to the towing vehicle, means pivotally connecting the other end of the other of said links to the trailing vehicle, the axes of said pivotal connections being disposed in planes perpendicular to each other, and a third link pivotally secured adjacent one end thereof to one of said pair of links and pivotally and slidably connected adjacent the other end thereof to the other of said pair of links.

8. A hitch coupling for securing a trailing vehicle to a towing vehicle comprising a gear segment pivotally connected to the towing vehicle, a second gear segment pivotally connected to the trailing vehicle and meshing with said gear segment, the pitch diameter of said second gear segment being greater than the pitch diameter of said gear segment, the axes of said pivotal connections being disposed in planes perpendicular to each other, and a link having one end pivotally connected to said gear segment at the axis thereof and the other end pivotally connected to said second gear segment at the axis thereof.

9. A hitch coupling for detachably securing a trailing vehicle to a towing vehicle comprising a gear segment pivotally connected to the towing vehicle, a second gear segment pivotally connected to the trailing vehicle and meshing with said gear segment, the axes of said pivotal connections being disposed in planes perpendicular to each other, and a connecting link having one end thereof pivotally secured to said gear segment and the other end thereof pivotally secured to said second gear segment.

10. A hitch coupling for detachably securing a trailing vehicle to a towing vehicle comprising a gear segment pivotally connected to the towing vehicle, a second gear segment pivotally connected to the trailing vehicle and meshing with said gear segment, the axes of said pivotal connections being disposed in planes perpendicular to each other, a pair of connecting links disposed one on each side of said gear segment and said second gear segment, means pivotally connecting one end of each of said links to each other and to said gear segment, and means pivotally connecting the other end of each of said links to each other and to said second gear segment.

JOHN S. CONNORS.

REFERENCES CITED

The following references are of record in the file of this patent:

UNITED STATES PATENTS

| Number | Name | Date |
|---|---|---|
| 1,101,158 | Wilde | June 23, 1914 |
| 1,195,954 | Rose | Aug. 22, 1916 |
| 1,422,186 | Davis | July 11, 1922 |
| 2,085,260 | Keys | June 29, 1937 |
| 2,167,792 | Alexander | Aug. 1, 1939 |